United States Patent [19]

Wright et al.

[11] Patent Number: 4,558,076
[45] Date of Patent: Dec. 10, 1985

[54] COATING COMPOSITIONS

[75] Inventors: Alan J. Wright, Sidcup; Kevin J. O'Hara, Maidstone; Stephen K. Turner, Orpington, all of England

[73] Assignee: Coates Brothers PLC, Kent, England

[21] Appl. No.: 643,409

[22] Filed: Aug. 23, 1984

[30] Foreign Application Priority Data

Jul. 3, 1984 [GB] United Kingdom ............... 8416927

[51] Int. Cl.$^4$ ..................... C09D 3/58; C09D 3/80
[52] U.S. Cl. ..................... 523/442; 523/456; 523/457; 523/458; 523/459; 528/92; 524/906
[58] Field of Search ............... 523/442, 456, 457, 458, 523/459; 528/92

[56] References Cited

U.S. PATENT DOCUMENTS

| 3,626,022 | 12/1971 | Suzuki et al. | 523/457 |
| 3,812,214 | 5/1974 | Markovitz | 528/92 |
| 3,932,343 | 1/1976 | Barie | 523/457 |
| 3,948,849 | 4/1976 | Barie | 523/457 |
| 4,108,824 | 8/1978 | Dante | 523/456 |
| 4,116,886 | 9/1978 | Cella | 528/92 |
| 4,126,596 | 11/1978 | Schimmel et al. | 524/906 |
| 4,137,275 | 1/1979 | Smith et al. | 528/92 |
| 4,237,242 | 12/1980 | Frankel | 528/92 |
| 4,297,457 | 10/1981 | Stark | 528/92 |
| 4,324,713 | 4/1982 | Kita et al. | 528/92 |

FOREIGN PATENT DOCUMENTS

| 54-127458 | 10/1979 | Japan | 528/92 |
| 991612 | 5/1965 | United Kingdom | 528/92 |
| 429658 | 2/1980 | U.S.S.R. | 524/906 |

Primary Examiner—Ronald W. Griffin
Attorney, Agent, or Firm—Louis E. Marn

[57] ABSTRACT

A coating composition comprises the following components dissolved in an organic solvent therefor:

(I) an addition copolymer derived from ethylenically unsaturated monomers and containing (a) from 0.8 to 8.0% by weight, based on the total weight of the polymer, of free carboxyl groups, and, optionally, (b) tertiary amino groups;

(II) one or more polyepoxide compounds present in an amount to provide from 0.2 to 2 epoxy groups for each carboxy group in the addition copolymer;

(III) an aluminum, titanium or zirconium alkoxide or complex thereof with a chelating agent therefor, present in an amount such that the amount of metal is from 0.05 to 2.0% by weight, based on the weight of the addition copolymer; and (IV) optionally, a tertiary amino compound; provided that component (IV) is present when the addition copolymer (I) does not contain tertiary amino groups and that the total amount of tertiary amino groups present in the composition provides from 0.1 to 2% by weight, based on the weight of the addition copolymer (I), of nitrogen.

9 Claims, No Drawings

COATING COMPOSITIONS

This invention is concerned with improvements in and relating to coating compositions and, more particularly, is concerned with coating compositions based on addition copolymers of ethylenically unsaturated monomers and containing free carboxyl groups.

Coating compositions based on free carboxyl group-containing addition copolymers are well known and commonly contain polyepoxide compounds as curing or cross-linking agents. Such compositions may be formulated for curing at relatively low temperatures by the use of appropriate catalysts, especially tertiary amine catalysts. The rate of cure of such systems at low or ambient temperatures is generally rather slow and thus relatively high molecular weight polymers containing relatively high levels of carboxyl groups are used together with relatively high levels of tertiary amine catalysts. However these systems suffer from the problem that they are generally of high viscosity and the level of acidic and basic groups can lead to water sensitivity and/or poor chemical resistance. Useful systems can be produced using lower levels of carboxyl groups in the polymer and lower catalyst levels, but cured films obtained therefrom are generally more weakly cross-linked and more solvent sensitive than other cold-setting compositions such as those based on hydroxy-group containing polymers cured with polyisocyanates.

It has now been found, in accordance with the present invention, that improved low temperature coating compositions based on free carboxyl group-containing polymers and polyepoxide compounds as curing agents may be obtained by incorporating in the composition another curing agent for the polymer, namely a complex of aluminium, titanium and/or zirconium.

Accordingly, the present invention provides a coating composition comprising the following components dissolved in an organic solvent therefor:

(I) an addition copolymer derived from ethylenically unsaturated monomers and containing (a) from 0.8 to 8.0% by weight, based on the total weight of the polymer, of free carboxyl groups, and, optionally, (b) tertiary amino groups;

(II) one or more polyepoxide compounds present in an amount to provide from 0.2 to 2 epoxy groups for each carboxy group in the addition copolymer;

(III) an aluminium, titanium or zirconium alkoxide or complex thereof with a chelating agent therefor, present in an amount such that the amount of metal is from 0.05 to 2.0% by weight, based on the weight of the addition copolymer; and (IV) optionally, a tertiary amino compound; provided that component (IV) is present when the addition copolymer (I) does not contain tertiary amino groups (b) and the total amount of tertiary amino groups present in the composition [from components (I) and/or IV provides from 0.1 to 2% by weight, based on the weight of the addition polymer (I), of nitrogen (N).

In use, compositions in accordance with the invention are applied to a substrate to be coated and the organic solvent allowed to evaporate from the composition after which there is relatively rapid reaction, due to the presence of the metal component, to provide early resistance to solvents whilst also providing improved resistance of the fully cured film to swelling and softening by strong solvents. A somewhat slower reaction between the carboxyl groups of the polymer and the polyepoxide compound, catalysed by the presence of tertiary amino groups, results in the formation of irreversible covalent cross-links.

The early development of resistance to strong solvents in particularly of advantage in industrial coatings, for example coatings for vehicles, where subsequent application of paints or lacquers dissolved in strong solvents can cause damage to underlying films.

As will be appreciated, even in the presence of organic solvents or diluents, compositions in accordance with the present invention will tend to react and, hence, they will most commonly be supplied as two pack systems. In such two pack systems, the polymer and polyepoxide should be present in separate packs but it is possible to incorporate the metal component in the pack containing the polymer provided that a stabilising compound (an additional chelating compound for the metal component) is also present. Such stabilising compounds are desirably present in the compositions of the invention in any event since they serve to increase the pot life of the composition.

The principal, and essential, component of the coating compositions of the invention is an addition copolymer containing free carboxyl groups and optionally containing tertiary amino groups. Such a copolymer may conveniently be prepared by copolymerising an appropriate mixture of ethylenically unsaturated monomers containing an ethylenically unsaturated carboxylic acid and, optionally, an ethylenically unsaturated tertiary amino compound, generally together with a balance of one or more other ethylenically unsaturated compounds.

Polymerisation will generally be carried out in a conventional manner in the presence of an organic solvent, which may usefully serve as the final solvent present in the coating composition, at elevated temperature, from 50° to 150° C., in the presence of a free radical generating compound or initiator such as a peroxy compound or azo compound, for example tertiary butyl perbenzoate or azobisisobutyronitrile.

Examples of suitable ethylenically unsaturated acids include acrylic acid, methacrylic acid, crotonic acid, itaconic acid and maleic anhydride; acrylic and methacrylic acids being preferred. Examples of suitable ethylenically unsaturated tertiary amino compounds include dialkylamino acrylates, dialkylamino methacrylates and vinyl pyridine; dimethylaminoethyl acrylate and dimethylaminoethyl methacrylate being preferred.

The ethylenically unsaturated monomers comprising the balance of the monomer mixture may for example be alkyl esters of acrylic acid, alkyl esters of methacrylic acid and styrene. As is well known in the art of formulating acrylic copolymers the nature and relative amounts of such other ethylenically unsaturated monomers may be chosen to provide cured films having desired properties such as hardness, adhesion and flexibility; monomers such as ethylacrylate and 2-ethyl hexyl acrylate conferring flexibility and monomers such as methyl methacrylate and styrene conferring hardness.

The second essential component of the coating compositions of the invention comprises one or more polyepoxide compounds, by which term is meant an organic compound or polymer containing two or more epoxide groups. A wide variety of polyepoxide compounds are known and are described for example, in "Handbook of Epoxy Resins", Lee and Neville, McGraw-Hill Book Co., 1967, pages 2-1 to 2-33.

Suitable epoxides for use in the compounds of the invention include aromatic glycidyl ethers, aliphatic glycidyl ethers and copolymers derived from, inter alia, glycidyl acrylate and glycidyl methacrylate.

Preferred polyepoxides are polyglycidyl ethers of aliphatic polyols such as, for example, neopentyl glycol diglycidyl ether, glycerol polyglycidyl ether, pentaerythritol polyglycidyl ether and sorbitol polyglycidyl ether. Examples of other polyexpoxides include diglycidyl ethers of bis-phenyl compounds such as bisphenol A and its condensates, the polyglycidyl ethers of polyhydric phenols such as resorcinol and the polyglycidyl ethers of phenol/formaldehyde condensates (epoxy novolacs).

The amount of polyepoxide compound present in the compositions of the invention should be such that there are from 0.2 to 2.0, preferably from 0.5 to 1.5, epoxide groups per carboxyl group present in the addition copolymer (I).

The third essential component of the composition of the invention is an aluminium, titanium or zirconium alkoxide which may be complexed with a chelating agent. Suitable chelating agents contain at least two groups which can bond to the metal atom and are typically diols or keto-enol tautomers or beta-dicarbonyl compounds. Examples of such materials include ethyl acetoacetate, acetyl acetone or dimethyl malonate. The metal compounds may contain only one metal atom or a plurality of metal atoms linked by oxygen atoms and thus may be represented by the formula:

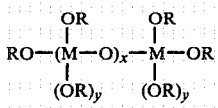

in which M represents Al, Ti or Zr; x is zero or an integer of from 1 to 10; y is 0 where M is Al or 1 when M is Ti or Zr, and the groups OR are the same or are different and each represents an alkoxy group or alkenyloxy group or the residue of a betadicarbonyl or beta-hydroxycarbonyl compound or two of the groups OR together represent an alkylenedioxy group. Suitable complexes are prepared by reaction of the metal alkoxide with an appropriate chelating agent and some such complexes are commercially available.

The metal compound should be present in an amount sufficient to provide from 0.05 to 2% by weight, preferably from 0.1 to 1% by weight, of metal based on the weight of the addition copolymer (I).

Where the addition copolymer (I) does not contain free tertiary amino groups there should also be present in the composition a tertiary amino compound (IV) in an amount to provide from 0.1 to 2% by weight, based on the weight of addition copolymer (I), of nitrogen.

Suitable tertiary amino compounds for use as the catalysts in promoting the carboxyl group/epoxide group reaction are well known and examples include trialkylamines such as triethylamine, tri-isopropyl amine, N,N-dimethylbutyl amine; alkylated polyamines such as tetra N-methyl ethylene diamine; alicyclic tertiary amines such as triethylene diamine; or hydroxyalkyl tertiary amines such as N,N-dimethyl ethanolamine and N-methyl diethanolamine.

Finally, the compositions of the invention should contain an organic solvent having components (I), (II) and (III) and/or (IV) dissolved therein. Suitable organic solvents include aromatic hydrocarbon, and aliphatic alcohols, esters, ketones and glycol ethers such as are commonly used in the art.

The organic solvent is suitably present in an amount of from 40 to 80% by weight of the total coating composition, typically 50 to 75% by weight of the composition. As will be appreciated, the level of organic solvent will to some extent depend upon the intended method of application of the composition, compositions intended for application by routes such as spraying or curtain-coating generally containing more solvent than compositions intended for application by brushing or roller coating.

As noted above, it is often desirable to also include in the composition a stabilising component or additional chelating agent for the metal compound. Suitable stabilising components comprise chelating agents such as those discussed above and it has been found that the strongest stabilising effect is obtained by the use of beta dicarbonyl compounds such as acetyl acetone.

The amount of such stabilising component present in the composition is suitably from 0.1 to 4 moles, preferably from 1 to 3 moles per mole of metal in component (III). In general, where it is intended to supply the compositions of the invention as two-pack systems, one pack of which contains both addition copolymer and metal complex, higher levels of stabilising component are desirable than when the composition is supplied as a two pack system in which the addition copolymer and metal complex are present in different packs.

The compositions of the invention may also contain colouring agents such as pigments (for example titanium dioxide, copper phthalocyanine and Hansa Yellow) or dyes and may also contain extenders. Where present such agents may be present in widely varying amounts, for example from 1 to 80% by weight, preferably from 3 to 50% by weight based on the weight of non-volatile components in the composition.

In order that the invention may be well understood the following examples are given by way of illustration. In the examples all parts, ratios and percentages are by weight unless otherwise stated.

EXAMPLE 1

(a) A reaction vessel equipped with a condenser, thermometer and stirrer was charged with 80 parts of xylene and 20 parts of n-butanol. One-fifth of the following mixture was also charged to the flask; 6.4 parts of acrylic acid, 54.8 parts of methyl methacrylate, 38.8 parts of butyl acrylate and 1 part of tertiary butyl perbenzoate. The air in the vessel was displaced by nitrogen and the contents were heated to 110° C. After 30 minutes the remaining four-fifths of the monomer mixture was added at a steady rate over 2 hours whilst maintaining a temperature of 110° C. Processing was then continued at the same temperature for a further 6 hours. A pale yellow, clear resin solution was obtained which had a viscosity of $Z_1$, (Gardner Holdt scale) a non-volatiles content of 50%.

A mixture of 50 parts of the acrylic solution prepared above, 100 parts of titanium dioxide pigment (Tiona 472 from Laporte Industries) and 25 parts of a 3:1 xylene/n-butanol mixture were milled in a ball-mill until the pigment was dispersed. A further 245 parts of the acrylic solution was then combined with the above pigment paste to give a white paint base.

(b) An aluminium complex was prepared by dissolving 63 parts of an aluminium isopropoxide/aluminium sec-butoxide mixture containing 11.7% Al in 98 parts of dry toluene and then adding 35 parts of ethyl acetoacetate with agitation. An exothermic reaction occurred and the mixture was allowed to cool to room temperature before use.

(c) A mixture was prepared by taking 27 parts of the aluminium complex solution from (b), 11.3 parts of acetyl acetone, 13 parts of glycerol polyglycidyl ether, 2 parts of dimethylaminoethanol and dissolving them in 50 parts of a 3:1 xylene/n-butanol mixture. To this solution was added 284 parts of the white paint base from (a) to give a coating composition of the invention.

Test panels were prepared by coating aluminium and treated steel (zinc phosphate coated) panels with the composition using a wire-wound coater to give a dry film thickness of approximately 25 microns. A thicker film (approx 50 microns dry) was also applied to glass panels using a bar coater for testing sensitivity to nitrocellulose solvent. All the panels were allowed to dry at ambient temperature for 7 days. Solvent resistance of the films was determined at 1 day, 3 days, 7 days and all other tests were carried out after 7 days cure at ambient temperatures.

Methyl ethyl ketone (MEK) and xylene resistance was determined by vigorously rubbing a small area of the film coated on aluminium with a cotton wool pad impregnated with the appropriate solvent and observing the time taken to reveal the substrate. The results in the Tables below are given on a scale of 1 to 5 in which 1 represents greater than 60 seconds resistance; 2, 45–60 seconds resistance; 3, 30–45 seconds resistance; 4, 15–30 seconds resistance; and 5, 0–15 seconds resistance.

Petrol (gasoline) resistance was determined by placing a few drops of the liquid on the film coated on aluminium allowing it to evaporate and observing the resulting damage. Results are given in the Tables below on a scale of 1 to 5 where 1 represents no observable effect and 2,3,4 and 5 represent slight, moderate, severe and very severe softening respectively.

Nitrocellulose solvent resistance was determined by placing a few drops of commercially available nitrocellulose thinner on the surface of a thick (approximately 50 microns) film which had been cut through to the substrate in an 'X' shape. This simulates conditions of commercial use in, for example, vehicle finishing where attack by strong solvent mixtures in subsequent coating operations can cause damage to existing coats. Results are given in the Tables below on a scale of 1 to 5 where 1 represents no effect and 2,3,4 and 5 represent softening, partial dissolution, dissolution and lifting respectively.

All the mechanical tests were carried out after 7 days ambient cure of films coated on treated steel (zinc phosphate coated). Adhesion was determined by cutting through the film in a cross-hatch pattern (1 mm squares) and observing the percentage film removed when a well adhered tape coated with pressure sensitive adhesive was separated shaply from the cut area. The other tests quoted in the Tables are standard tests used in the surface coatings industry.

Humidity resistance was determined by placing coated aluminium panels in a cabinet maintained at 45° C. and 100% relative humidity for 7 days. Results are shown in the Tables on a scale of 1 to 5 in which 1 represents no effect, 2 represents very slight loss of gloss, 3 represents slight loss of gloss, 4 represents a marked loss of gloss and 5 represents blistering or other severe film damage as assessed by visual inspection of the panels.

EXAMPLE 2

A solution was prepared by dissolving 11.3 parts of ethoxy isopropoxy titanium bisacetylacetonate solution (Tilcom P 1-2 from Tioxide UK PLC), 13.0 parts of glycerol polyclidyl ether and 2 parts of dimethylamino ethanol in 50 parts of a 3:1 xylene/n-butanol mixture. To this solution was added 284 parts of the white paint base described in Example 1(a).

Films of this composition were applied, cured and tested as in Example 1.

EXAMPLE 3

A solution was prepared by dissolving 27 parts of the aluminium complex described in Example 1(b), 11.3 parts of acetyl acetone, 6.5 parts of glycerol polyclycidyl ether and 2 parts of dimethylaminoethanol in 50 parts of a 3:1 xylene n-butanol mixture. To this solution was added 284 parts of the white paint base described in Example 1(a).

Films of this composition were applied, cured and tested as in Example 1.

EXAMPLE 4

A solution was prepared by dissolving 27 parts of the aluminium complex described in Example 1(b), 11.3 parts of acetyl acetone, 17 parts of an aromatic diglycidyl ether (Epikote 828 from Shell) and 2 parts of dimethylaminoethanol in 50 parts of a 3:1 xylene/n-butanol mixture. To this solution was added 284 parts of the white paint base described in Example 1(a).

Films of the composition were applied, cured and tested as in Example 1.

EXAMPLE 5

A solution was prepared as in Example 4 except that 17 parts of sorbitol pollyglycidyl ether were used in place of the aromatic diglycidyl ether. To this solution was added 284 parts of the white paint base described in Example 1.

Films of the composition were applied, cured and tested as in Example 1.

EXAMPLE 6

(a) A reaction vessel equipped with a condenser, thermometer and stirrer was charged with 80 parts of xylene and 20 parts of n-butanol. One fifth of the following mixture was also charged to the flask: 3.8 parts of methacrylic acid, 40.2 parts of styrene monomer, 56 parts of ethyl acrylate and 0.75 parts of tertiary butyl perbenzoate. Processing was carried out in an identical manner to Example 1(a) and a pale yellow, clear resin solution was obtained which had a viscosity of X (Gardner Holdt) and a non-volatiles content of 50%.

A white paint base was prepared in an identical manner to Example 1(a) from the above resin.

(b) A solution was prepared by dissolving 13.5 parts of the aluminium complex described in Example 1(b), 5.6 parts of acetyl acetone, 6.5 parts of glycerol polyglycidyl ether and 2 parts of dimethylaminoethanol in 50 parts of 3:1 xylene/n-butanol mixture. To this solution was added 284 parts of the white paint base of (a) above.

Films of the composition were applied, cured and tested as in Example 1.

EXAMPLE 7

A solution was prepared by dissolving 5.7 parts of the titanium complex described in Example 2, 6.5 parts of glycerol polyglycidyl ether and 2 parts of dimethylaminoethanol in 50 parts of 3:1 xylene/n-butanol mixture. To this solution was added 284 parts of the whit paint base described in Example 6(a). Films of the composition woere applied and tested as in Example.

EXAMPLE 8

A zirconium complex was prepared by dissolving 38.3 parts of tetra n-butyl zirconate in 32.7 parts of dry toluene then adding 20 parts of acetyl acetone with agitation. An exothermic reaction occurred and the mixture was allowed to cool to room temperature before use.

A solution was prepared by dissolving 10 parts of the zirconium complex described above, 6.5 parts of glycerol polyglycidyl ether, 1.1 parts of acetyl acetone and 2 parts of dimethylaminoethanol in 50 parts of 3:1 xylene/n-butanol mixture. To this solution was added 284 parts of the white paint base described in Example 6.

Films of the composition were applied, cured and tested as in Example 1.

EXAMPLE 9

(a) A reaction vessel equipped with a condenser, thermometer and stirrer was charged with 25 parts of toluene and 25 parts of isobutanol. One fifth of the following mixture was also charged to the vessel: 5.2 parts of acrylic acid, 4.2 parts of dimethylaminoethyl acrylate, 30.3 parts of styrene monomer, 30.3 parts of methyl methacrylate and 30.0 parts of 2-ethyl hexyl acrylate. 0.5 parts of azobisisobutyronitrile (AZBN) were added to the reaction vessel, the air vessel was displaced by nitrogen gas and the contents heated to 85° C. After 30 minutes the remaining four-fifths of the monomer mixture were added at a steady rate over 90 minutes whilst maintaining the temperature at 85° C. Two further additions of 0.5 parts of AZBN were made to the reaction vessel at 30 and 60 minutes after starting the addition of the remaining four-fifths of the monomer mixture. Processing was then continued at the same temperature for 10 hours, adding 0.2 parts of AZBN at 2,4,6 and 8 hours after completing the addition of the monomer mixture. The resin was then thinned with 25 parts of toluene and 25 parts of isobutanol to yield a clear yellow solution of viscosity W (Gardner-Holdt) and a non-volatiles content of 50%.

A white paint base was prepared in an identical manner to Example 1(a) from the above resin.

(b) A solution was prepared by dissolving 21.5 parts of the aluminium complex described in Example 1(b), 6 parts of acetyl acetone and 10 parts of glycerol polyglycidyl ether in 50 parts of 3:1 xylene/butanol mixture. To this solution was added 284 parts of the white paint base of (a) above.

Films of the composition were applied, cured and tested as in Example 1.

EXAMPLE 10

A solution was prepared by dissolving 9 parts of the titanium complex described in Example 2, and 10 parts of glycerol polyglycidyl ether in 50 parts of 3:1 xylene/butanol complex. To this solution was added 284 parts of the white paint base described in Example 9(a).

Films of the composition were applied, cured and tested as in Example 1.

EXAMPLE 11

A solution was prepared by dissolving 21.5 parts of the aluminium complex described in Example 1(b), 6 parts of acetyl acetone and 13.5 parts of an aromatic diglycidyl ether (Epikote 828) in 50 parts of 3:1 xylene/n-butanol mixture. To this solution was added 284 parts of the white paint base described in Example 9(a).

Films of the composition were applied, cured and tested as in Example 1.

EXAMPLE 12

A solution was prepared as in Example 11 except that 13.5 parts of sorbitol polyglycidyl ether was used in place of the aromatic diglycidyl ether. To this solution was added 284 parts of the white paint base described in Example 9(a).

Films of the composition were applied, cured and tested as in Example 1.

EXAMPLE 13

A glycidyl methacrylate containing copolymer was prepared by polymerising together 43 parts of glycidyl methacrylate, 15 parts of styrene and 42 parts of butyl acrylate in a 3:1 xylene/n-butanol mixture by methods well known in the art to give a clear resin solution of viscosity $Z_1$ (Gardener-Holdt) and a non-volatile content of 70%.

A solution was prepared by dissolving 21.5 parts of the aluminium complex described in Example 1, 6 parts of acetyl acetone and 36 parts of the glycidyl methacrylate copolymer solution described above in 50 parts of 3:1 xylene/n-butanol mixture. To this solution was added 284 parts of the white paint base described in Example 9a. Films were applied, cured and tested as in Example 1.

COMPARATIVE EXAMPLE 1

A solution was prepared by dissolving 13.0 parts of glycerol polyglycidyl ether and 2 parts of dimethylaminoethanol in 50 parts of a 3:1 xylene/n-butanol mixture. To this solution was added 284 parts of the white paint base described in Example 1(a).

Films of the composition were applied, cured and tested as in Example 1 but coatings of inferior resistance to solvents and petrol were obtained, when compared with those of Examples 1 and 2.

COMPARATIVE EXAMPLE 2

A solution was prepared by dissolving 27 parts of the aluminium complex described in Example 1(b) and 11.3 parts of acetylacetone in 50 parts of a 3:1 xylene/n-butanol mixture. To this solution was added 284 parts of the white paint base described in Example 1(a).

Films were applied, cured and tested as in Example 1 but coating of inferior resistance to solvents and humidity were obtained as compared with those of Example 1.

COMPARATIVE EXAMPLE 3

A solution was prepared by dissolving 11.3 parts of the titanium complex described in Example 2 in 50 parts of a 3:1 xylene/n-butanol mixture. To this solution was added 284 parts of the white paint base described in Example 1(a).

Films of the composition were applied, cured and tested as in Example 1 but coatings of inferior resistance to solvents and humidity were obtained, when compared with that of Example 2.

COMPARATIVE EXAMPLE 4

A solution was prepared by dissolving 6.5 parts of glycerol polyglycidyl ether and 2 parts of dimethylaminoethanol in 50 parts of 3:1 xylene/n-butanol mixture. To this solution was added 284 parts of the white paint base described in Example 1(a).

Films of the composition were applied, cured and tested as in Example 1 but coatings of inferior resistance to solvents and petrol were obtained, when compared with those of Example 3.

COMPARATIVE EXAMPLE 5

A solution was prepared by dissolving 17 parts of an aromatic diglycidyl ether (Epikote 828) and 2 parts of dimethylaminoethanol in 50 parts of 3:1 xylene/n-butanol mixture. To this solution was added 184 parts of white paint base described in Example 1(a).

Films of the composition were applied, cured and tested as in Example 1 but coatings of inferior resistance to solvents and petrol were obtained when compared with those of Example 4.

COMPARATIVE EXAMPLE 6

A solution was prepared by dissolving 17 parts of sorbitol polyglycidyl ether and 2 parts of dimethylaminoethanol in 50 parts of xylene/n-butanol mixture. To this solution was added 284 parts of the white paint base described in Example 1(a).

Films of the composition were applied, cured and tested as in Example 1 but coatings of inferior resistance to solvents and petrol were obtained, when compared with those of Example 5.

COMPARATIVE EXAMPLE 7

A solution was prepared by dissolving 6.5 parts of glycerol polyglycidyl ether and 2 parts of dimethylaminoethanol in 50 parts of 3:1 xylene/n-butanol mixture. To this solution was added 284 parts of the white paint base described in Example 6(a).

Films of the composition were applied, cured and tested as in Example 1 but coatings of inferior resistance to solvents were obtaned when compared with those of Examples 6 and 7.

COMPARATIVE EXAMPLE 8

A solution was prepared by dissolving 13.5 parts of the aluminium complex described in Example 1(b) and 5.6 parts of acetyl acetone in 50 parts of xylene/n-butanol mixture. To this solution was added 284 parts of the white paint base described in Example 6(a).

Films of the composition were applied, cured and tested as in Example 1 but coatings of inferior resistance to solvents were obtained when compared with that of Example 6.

COMPARATIVE EXAMPLE 9

A solution was prepared by dissolving 10 parts of the zirconium complex described in Example 8 and 1.1 parts of acetyl acetone in 50 parts of 3:1 xylene/n-butanol mixture. To this solution was added 284 parts of the white paint base described in Example 6.

Films were applied, cured and tested as in Example 1 but coatings of inferior resistance to solvents were obtained when compared with Example 8.

COMPARATIVE EXAMPLE 10

A solution was prepared by dissolving 10 parts of glycerol polyglycidyl ether in 50 parts of a 3:1 xylene/n-butanol mixture. To this solution was added 284 parts of the white paint base described in Example 9(a).

Films of the composition were applied, cured and tested as in Example 1 but coatings of inferior solvent and petrol resistance were obtained compared with those of Examples 9 and 10.

COMPARATIVE EXAMPLE 11

A solution was prepared by dissolving 21.5 parts of the aluminium complex described in Example 1(b) and 6 parts of acetyl acetone in 50 parts of 3:1 xylene/n-butanol mixture. To this solution was added 284 parts of the paint base described in Example 9(a).

Films of the composition were applied, cured and tested as in Example 1 but coatings of inferior resistance to solvents, petrol and humidity were obtained, compared with that of Example 9.

COMPARATIVE EXAMPLE 12

A solution was prepared by dissolving 36 parts of the glycidyl methacrylate copolymer solution described in Example 13 in 50 parts of a 3:1 xylene/n-butanol mixture. To this solution was added 284 parts of the white paint base described in Example 9. Films were applied, cured and tested as in Example 1 but coatings of inferior solvent and humidity resistance were obtained compared with Example 13.

The results of the various tests are shown in Tables 1–3.

TABLE 1

| | | EXAMPLES | | | | | COMPARATIVE EXAMPLES | | | | | |
|---|---|---|---|---|---|---|---|---|---|---|---|---|
| | | 1 | 2 | 3 | 4 | 5 | 1 | 2 | 3 | 4 | 5 | 6 |
| Xylene resistance | 1 day | 1 | 1 | 1 | 4 | 2 | 5 | 3 | 1 | 5 | 5 | 5 |
| | 3 days | 1 | 1 | 1 | 1 | 1 | 5 | 2 | 2 | 5 | 5 | 5 |
| | 7 days | 1 | 1 | 1 | 1 | 1 | 1 | 2 | 1 | 5 | 5 | 1 |
| Methyl ethyl ketone resistance | 1 day | 4 | 4 | 5 | 5 | 5 | 5 | 5 | 4 | 5 | 5 | 5 |
| | 3 days | 1 | 1 | 4 | 5 | 1 | 5 | 5 | 4 | 5 | 5 | 5 |
| | 7 days | 1 | 1 | 1 | 2 | 1 | 4 | 4 | 4 | 5 | 5 | 1 |
| Petrol resistance | 1 day | 2 | 2 | 3 | 4 | 3 | 4 | 2 | 2 | 4 | 4 | 4 |
| | 3 days | 2 | 2 | 2 | 2 | 2 | 4 | 2 | 3 | 3 | 3 | 3 |
| | 7 days | 1 | 1 | 1 | 1 | 1 | 3 | 1 | 1 | 2 | 3 | 2 |
| Nitrocellulose solvent resistance | 1 day | 3 | 2 | 4 | 3 | 3 | 4 | 3 | 3 | 4 | 4 | 4 |
| | 3 days | 3 | 2 | 3 | 3 | 5 | 4 | 3 | 3 | 4 | 4 | 2 |
| | 7 days | 2 | 2 | 2 | 2 | 2 | 5 | 3 | 3 | 2 | 3 | 5 |
| Humidity resistance | | 1 | 1 | 1 | 2 | 1 | 2 | 4 | 4 | 3 | 3 | 1 |
| Gloss (60° C.) | | 78 | 74 | 78 | 80 | 80 | 84 | 80 | 71 | 81 | 85 | 84 |
| Crosshatch | | 100/ | 100/ | 100/ | 100/ | 100/ | 100/ | 100/ | 100/ | 100/ | 100/ | 100/ |

TABLE 1-continued

|  | EXAMPLES | | | | | COMPARATIVE EXAMPLES | | | | | |
| --- | --- | --- | --- | --- | --- | --- | --- | --- | --- | --- | --- |
|  | 1 | 2 | 3 | 4 | 5 | 1 | 2 | 3 | 4 | 5 | 6 |
| adhesion | 100 | 100 | 100 | 100 | 100 | 100 | 100 | 100 | 100 | 100 | 100 |
| Mandrel bend | 3 mm | 3 mm | 3 mm | 3 mm | 3 mm | 3 mm | 3 mm | 3 mm | 3 mm | 3 mm | 3 mm |
| Pencil hardness | H | H | H | H | H | F | H | F | F | F | F |
| Erichsen indent | 10 mm | 10 mm | 10 mm | 10 mm | 10 mm | 10 mm | 10 mm | 10 mm | 10 mm | 10 mm | 10 mm |

TABLE 2

|  |  | EXAMPLES | | | COMPARATIVE EXAMPLES | | |
| --- | --- | --- | --- | --- | --- | --- | --- |
|  |  | 6 | 7 | 8 | 7 | 8 | 9 |
| Xylene resistance | 1 day | 5 | 5 | 5 | 5 | 5 | 5 |
|  | 3 days | 2 | 2 | 1 | 5 | 5 | 5 |
|  | 7 days | 1 | 1 | 1 | 2 | 5 | 5 |
| Methyl ethyl ketone resistance | 1 day | 5 | 5 | 5 | 5 | 5 | 5 |
|  | 3 days | 5 | 5 | 4 | 5 | 5 | 5 |
|  | 7 days | 1 | 1 | 1 | 4 | 5 | 5 |
| Petrol resistance | 1 day | 4 | 4 | 3 | 4 | 5 | 3 |
|  | 3 days | 3 | 3 | 3 | 3 | 3 | 3 |
|  | 7 days | 2 | 2 | 2 | 3 | 3 | 3 |
| Nitrocellulose solvent resistance | 1 day | 4 | 3 | 3 | 4 | 4 | 3 |
|  | 3 days | 3 | 3 | 3 | 4 | 5 | 3 |
|  | 7 days | 2 | 2 | 2 | 2 | 4 | 3 |
| Humidity resistance |  | 2 | 2 | 2 | 2 | 4 | 3 |
| Gloss (60° C.) |  | 90 | 90 | 86 | 93 | 93 | 87 |
| Crosshatch adhesion |  | 100/100 | 100/100 | 100/100 | 100/100 | 100/100 | 100/100 |
| Mandrel bend |  | 3 mm | 3 mm | 3 mm | 3 mm | 3 mm | 3 mm |
| Pencil hardness |  | F | F | F | F | F | B |
| Erichsen indent |  | 10 mm | 10 mm | 10 mm | 10 mm | 10 mm | 10 mm |

TABLE 3

|  |  | EXAMPLES | | | | | COMPARATIVE EXAMPLES | | |
| --- | --- | --- | --- | --- | --- | --- | --- | --- | --- |
|  |  | 9 | 10 | 11 | 12 | 13 | 10 | 11 | 12 |
| Xylene resistance | 1 day | 1 | 1 | 1 | 1 | 5 | 4 | 5 | 5 |
|  | 3 days | 1 | 1 | 1 | 1 | 4 | 4 | 5 | 5 |
|  | 7 days | 1 | 1 | 1 | 1 | 2 | 1 | 4 | 4 |
| Methyl ethyl ketone resistance | 1 day | 4 | 2 | 5 | 4 | 5 | 5 | 5 | 5 |
|  | 3 days | 1 | 1 | 3 | 1 | 4 | 1 | 5 | 5 |
|  | 7 days | 1 | 1 | 1 | 1 | 4 | 1 | 5 | 5 |
| Petrol resistance | 1 day | 2 | 2 | 3 | 2 | 3 | 5 | 5 | 4 |
|  | 3 days | 2 | 2 | 2 | 2 | 2 | 2 | 2 | 3 |
|  | 7 days | 1 | 1 | 1 | 1 | 1 | 2 | 1 | 2 |
| Nitrocellulose solvent resistance | 1 day | 5 | 2 | 3 | 5 | 3 | 5 | 4 | 4 |
|  | 3 days | 2 | 2 | 2 | 2 | 5 | 5 | 4 | 5 |
|  | 7 days | 2 | 2 | 2 | 2 | 5 | 2 | 3 | 5 |
| Humidity resistance |  | 1 | 1 | 4 | 1 | 2 | 1 | 4 | 4 |
| Gloss (60° C.) |  | 87 | 88 | 90 | 88 | 88 | 89 | 88 | 89 |
| Crosshatch adhesion |  | 100/100 | 100/100 | 95/100 | 100/100 | 100/100 | 100/100 | 95/100 | 100/100 |
| Mandrel bend |  | 3 mm | 18 mm | 12 mm | 3 mm | 30 mm | 3 mm | 12 mm | 30 mm |
| Pencil hardness |  | H | H | F | H | F | H | F | F |
| Erichsen indent |  | 9 mm | 9 mm | 1 mm | 9 mm | 1 mm | 3 mm | 3 mm | 1 mm |

We claim:

1. A coating composition comprising the following components dissolved in an organic solvent therefor:
   (I) an addition copolymer derived from ethylenically unsaturated monomers and containing (a) from 0.8 to 8.0% by weight of free carboxyl groups based on the total weight of said addition copolymer, and (b) tertiary amino groups in an amount from 0.0 to 2% by weight of nitrogen based on said addition copolymer;
   (II) at least one polyepoxide compound present in amount to provide from 0.2 to 2 epoxy groups for each carboxyl group in the addition copolymer;
   (III) a metal compound selected from the group consisting of aluminum alkoxide, titanium alkoxide, zirconium alkoxide and complxes thereof together with a chelating agent therefor, present in an amount from 0.05 to 2.0% by weight, based on weight of said addition copolymer; and
   (IV) a tertiary amino compound having tertiary amino groups and present in an amount of from 2 to 0.0% by weight of nitrogen based on said addition copolymer, a total amount of tertiary amino groups present in said composition providing from 0.1 to 2% by weight of nitrogen based on the weight of the addition copolymer.

2. The composition as claimed in claim 1 in which said polyepoxide (II) is a polyglycidyl ether of an aliphatic polyol.

3. The composition as claimed in claim 1 in which said polyepoxide (II) provides from 0.5 to 1.5 epoxide groups per carboxyl group present in said addition copolymer (I).

4. The composition as claimed in claim 1 in which said metal compound (III) is complexed with a compound selected from the group consisting of a diol, keto-enol tautomer and beta-dicarbonyl.

5. The composition as claimed in claim 1 in which component (III) is present in an amount from 0.1 to 1% by weight based on weight of said addition copolymer (I).

6. The composition as claimed in claim 1 containing from 40 to 80% by weight of organic solvent, based on total weight of said composition.

7. The composition as claimed in claim 1 and also containing a stabilising component or additional chelating agent for said metal compound (III).

8. The composition as claimed in claim 7 in which said stabilising component is present in an amount of from 0.1 to 4 moles, per mole of metal compound in component (III).

9. The composition as claimed in claim 1 in a two pack system, said addition copolymer (I) and said polyepoxide (II) being present in separate packs.

* * * * *

UNITED STATES PATENT AND TRADEMARK OFFICE
CERTIFICATE OF CORRECTION

PATENT NO. : 4,558,076
DATED : DECEMBER 10, 1985
INVENTOR(S) : WRIGHT ET AL.

It is certified that error appears in the above-identified patent and that said Letters Patent is hereby corrected as shown below:

<u>In the Claims</u>

Claim 1, line 17, after "amount" insert -- such that the amount of metal is --; and Claim 5, line 3, after "weight" insert -- of metal --.

Signed and Sealed this

Twenty-ninth Day of July 1986

[SEAL]

Attest:

Attesting Officer

DONALD J. QUIGG

Commissioner of Patents and Trademarks